United States Patent
Yamasaki (10) Patent No.: US 11,243,728 B2
(45) Date of Patent: Feb. 8, 2022

(54) PRINTING PROCESS MANAGEMENT APPARATUS AND NON-TRANSITORY COMPUTER READABLE MEDIUM STORING PRINTING PROCESS MANAGEMENT PROGRAM FOR DISPLAYING STATUS OF PRINTING PROCESS

(71) Applicant: FUJIFILM Business Innovation Corp., Tokyo (JP)

(72) Inventor: Naoto Yamasaki, Kanagawa (JP)

(73) Assignee: FUJIFIILM Business Innovation Corp., Tokyo (JP)

( * ) Notice: Subject to any disclaimer, the term of this patent is extended or adjusted under 35 U.S.C. 154(b) by 240 days.

(21) Appl. No.: 16/354,209

(22) Filed: Mar. 15, 2019

(65) Prior Publication Data

US 2019/0369932 A1 Dec. 5, 2019

(30) Foreign Application Priority Data

May 31, 2018 (JP) .............................. JP2018-104306

(51) Int. Cl.
*G06F 3/12* (2006.01)
*G06F 3/0481* (2013.01)

(52) U.S. Cl.
CPC ........ *G06F 3/1259* (2013.01); *G06F 3/04817* (2013.01); *G06F 3/1207* (2013.01); *G06F 3/1243* (2013.01)

(58) Field of Classification Search
None
See application file for complete search history.

(56) References Cited

U.S. PATENT DOCUMENTS

| | | | |
|---|---|---|---|
| 6,225,998 B1 * | 5/2001 | Okita | ........................ G06F 8/34 707/999.102 |
| 6,380,951 B1 * | 4/2002 | Petchenkine | ......... G06F 3/1204 715/736 |
| 2004/0136276 A1 * | 7/2004 | Lander | ................ G06F 3/04817 368/239 |

(Continued)

FOREIGN PATENT DOCUMENTS

JP 2017049848 3/2017

*Primary Examiner* — Henok Shiferaw
(74) *Attorney, Agent, or Firm* — JCIPRNET (57) ABSTRACT

A printing process management apparatus includes a first display controller that controls a display to display, in association with printing information, a first graphical object in which plural step-representing graphical objects corresponding to plural processing steps for the printing information are arrayed in a sequence identical to a sequence of the processing steps, a second display controller that acquires status information indicating a processing status of the printing information in each of the processing steps and controls the display to display a first step-representing graphical object corresponding to a first processing step whose status information indicates that processing is in progress while changing a format of the first step-representing graphical object to a format different from formats of other step-representing graphical objects, and a third display controller that controls the display to display information indicating details of the processing performed in the first processing step while juxtaposing the information with the first graphical object.

14 Claims, 10 Drawing Sheets

(56) References Cited

U.S. PATENT DOCUMENTS

| | | | |
|---|---|---|---|
| 2005/0141006 A1* | 6/2005 | Aiyama | G06K 15/007 |
| | | | 358/1.13 |
| 2005/0243365 A1* | 11/2005 | Noda | G06F 3/1288 |
| | | | 358/1.15 |
| 2006/0080616 A1* | 4/2006 | Vogel | G06F 9/451 |
| | | | 715/769 |
| 2011/0231798 A1* | 9/2011 | Cok | G06Q 10/103 |
| | | | 715/823 |
| 2019/0079785 A1* | 3/2019 | Hori | G06F 3/04817 |
| 2020/0230856 A1* | 7/2020 | Enomoto | B29C 45/1774 |
| 2021/0168249 A1* | 6/2021 | Shiotani | H04N 1/00474 |

* cited by examiner

| PROCESSING DEVICE ID | PROCESSING STEP ID | PROCESSING STATUS | STATUS |
|---|---|---|---|
| | | | |

FIG. 10

- 1010 / 1012 / 1014: PREPRESS - GROUPING IN PROGRESS
- 1020 / 1022 / 1024: PREPRESS - GROUPING ERROR
- 1030 / 1032 / 1034: BOOKBINDING - ALERT

FIG. 11

| ORDER ID | ORDER STATUS |
|---|---|
| 170 | MANUSCRIPT RECEPTION COMPLETED (PREPRESS PENDING) |
| 172 | BOOKBINDING COMPLETED (INSPECTION PENDING) |
| 173 | MANUSCRIPT RECEPTION COMPLETED (PREPRESS PENDING) |
| 174 | MANUSCRIPT RECEPTION COMPLETED (PREPRESS PENDING) |
| 175 | MANUSCRIPT RECEPTION COMPLETED (PREPRESS PENDING) |

PRINTING PROCESS MANAGEMENT APPARATUS AND NON-TRANSITORY COMPUTER READABLE MEDIUM STORING PRINTING PROCESS MANAGEMENT PROGRAM FOR DISPLAYING STATUS OF PRINTING PROCESS

CROSS-REFERENCE TO RELATED APPLICATIONS

This application is based on and claims priority under 35 USC 119 from Japanese Patent Application No. 2018-104306 filed May 31, 2018.

BACKGROUND

(i) Technical Field

The present disclosure relates to a printing process management apparatus and a non-transitory computer readable medium storing a printing process management program.

(ii) Related Art

Japanese Unexamined Patent Application Publication No. 2017-049848 discloses an object to provide an information processing apparatus and a control method therefor. The information processing apparatus is provided for products to be produced through a plurality of steps and easily performs progress management on a product basis and progress management on a step basis. The information processing apparatus includes a first generator that generates a display screen in which elements corresponding to the products to be produced through the plurality of steps are displayed in array, a second generator that generates a display screen in which elements corresponding to the steps are displayed in array, a display controller that displays any one display screen out of the display screen generated by the first generator and the display screen generated by the second generator, and a switcher that switches the display screen generated by the first generator to the display screen generated by the second generator or switches the display screen generated by the second generator to the display screen generated by the first generator.

SUMMARY

Aspects of non-limiting embodiments of the present disclosure relate to the following case. For example, there is a system that manages a series of printing steps (workflow) such as (1) manuscript redeption, (2) pre-processing (prepress), (3) printing (press), (4) post-processing (postpress), (5) inspection, and (6) delivery. In recent years, printing costs have been reduced by increasing the overall utilization rate of the printing system in such a manner that a plurality of print jobs for a small number of copies are processed collectively as a print job for a large number of copies. When the overall utilization rate of the printing system is increased, different print jobs related to a plurality of orders are processed simultaneously. If the progress of a certain print job is delayed under such a situation, the delay may affect the progress of other print jobs. Therefore, there is a demand for a printing process management system that may manage the overall progress of the plurality of print jobs that proceed simultaneously.

Aspects of non-limiting embodiments of the present disclosure also relate to a printing process management apparatus and a non-transitory computer readable medium storing a printing process management program, in which the progress of a plurality of print jobs may be monitored.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing process management apparatus comprising a first display controller that controls a display to display, in association with printing information, a first graphical object in which a plurality of step-representing graphical objects corresponding to a plurality of processing steps for the printing information are arrayed in a sequence identical to a sequence of the processing steps, a second display controller that acquires status information indicating a processing status of the printing information in each of the processing steps and controls the display to display a first step-representing graphical object corresponding to a first processing step whose status information indicates that processing is in progress while changing a format of the first step-representing graphical object to a format different from formats of other step-representing graphical objects, and a third display controller that controls the display to display information indicating details of the processing performed in the first processing step while juxtaposing the information with the first graphical object.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described below with reference to the drawings.

Figure 1:
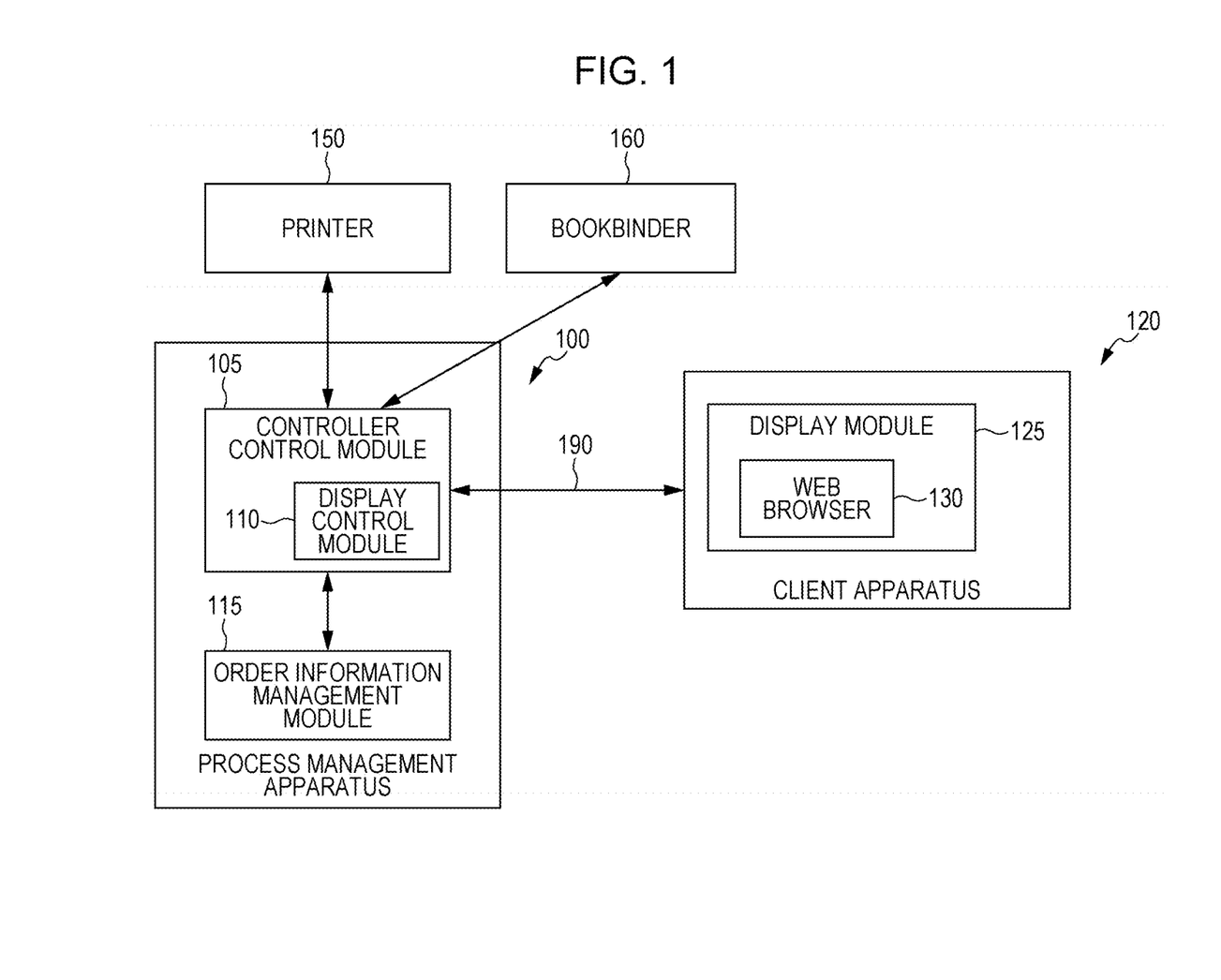
FIG. 1 schematically illustrates the configuration of modules as an example of the configuration of this exemplary embodiment.

FIG. 1 schematically illustrates the configuration of modules as an example of the configuration of this exemplary embodiment.

The term "module" generally refers to a logically separable component of software (computer program), hardware, or the like. Therefore, the module in this exemplary embodiment refers to not only a module in a computer program but also a module in a hardware configuration. Thus, this exemplary embodiment also serves as description of a computer program for implementing the module (a program for causing a computer to execute each procedure, a program for causing a computer to function as each unit, or a program for causing a computer to implement each function), a system, and a method. For convenience of description, the terms "store", "cause to store", and other equivalent terms are used. When the exemplary embodiment is directed to a computer program, those terms mean that an object is stored in a storage device or control is performed to store an object in a storage device. The module may have one-to-one correspondence with a function. In the implementation, one module may be configured by one program, a plurality of modules may be configured by one program, or one module may be configured by a plurality of programs. A plurality of modules may be executed by one computer or one module may be executed by a plurality of computers in a distributed or parallel environment. One module may include any other module. The term "connection" is hereinafter used not only for physical connection but also for logical connection (such as data exchange, instructions, data reference relationships, or login). The term "predetermined" refers to a state that is determined before processing of interest. This term means any state that is determined not only before the start of processing of this exemplary embodiment but also after the start of processing of this exemplary embodiment depending on a current situation or condition or on a situation or condition thus far as long as the state is determined before processing of interest. When a plurality of "predetermined values" are present, the values may be different from each other or two or more values (including a case of all the values) may be equal to each other. The description "when A is true, B is conducted" means that "determination is made on whether A is true and B is conducted when A is true as a result of the determination". This description excludes a case where there is no need to determine whether A is true. Enumeration of matters in the form of, for example, "A, B, and C" is enumeration of examples unless otherwise noted and encompasses a case where one of the examples is selected alone (for example, only A).

The term "system" or "apparatus" not only encompasses configurations in which a plurality of computers, hardware configurations, apparatuses, or the like are connected by a communication medium such as a network (including connections that support one-to-one communications) but also encompasses configurations implemented by a single computer, hardware configuration, apparatus, or the like. The terms "apparatus" and "system" are used interchangeably. As a matter of course, the term "system" excludes a mere social "mechanism" (social system) that is organized by humans.

In each processing operation performed by a module or in each of a plurality of processing operations performed by a module, information to be processed is read from a storage device and a processing result obtained after the processing operation is written into the storage device. Thus, description may be omitted for the reading from the storage device before the processing operation and the writing into the storage device after the processing operation. The storage device herein encompasses hard disks, a random access memory (RAM), external storage media, storage devices connected via a communication network, and registers inside a central processing unit (CPU).

A process management apparatus 100 according to this exemplary embodiment manages a printing process that uses a printer 150, a bookbinder 160, and the like. As illustrated in the example of FIG. 1, the process management apparatus 100 includes a controller control module 105 and an order information management module 115. The printing process management involves control for displaying at least the progress of the printing process so as to allow a user (such as an operator or an administrator) to monitor the progress of the printing process.

A printed product is formed of a plurality of print parts such as a book block, a front cover, and a back cover. As the overall utilization rate of a printing system is increased, a print job related to one order may be processed across a plurality of steps. Even in a case of one print job, the progress of each of the plurality of steps is monitored. For example, if the steps are managed by independent progress management systems, the user needs to access all the necessary progress management systems without efficiency. In this exemplary embodiment, a plurality of workflows with a plurality of processing steps may be managed connectively (for example, the progress may be displayed).

The controller control module 105 includes a display control module 110 and is connected to the order information management module 115, the printer 150, and the bookbinder 160. The controller control module 105 is also connected to a client apparatus 120 via a communication network 190. The controller control module 105 controls the printer 150, the bookbinder 160, and the like and also controls the client apparatus 120 to display the progress of a printing process.

The display control module 110 acquires processing statuses of the printer 150, the bookbinder 160, and the like and controls the client apparatus 120 to display the progress of the printing process. Detailed functions (such as actions) of the display control module 110 are described later in an example of FIG. 2.

The order information management module 115 is connected to the controller control module 105. The order information management module 115 receives a print job or the like in accordance with a printing workflow and instructs the controller control module 105 to control the printer 150, the bookbinder 160, and the like in accordance with the workflow.

The client apparatus 120 includes a display module 125 and is connected to the controller control module 105 of the process management apparatus 100 via the communication network 190. The client apparatus 120 is a terminal to be operated by operators of the process management apparatus 100, the printer 150, the bookbinder 160, and the like and an administrator of the printing workflow. Examples of the client apparatus 120 include a personal computer and a mobile terminal.

The display module 125 includes a web browser 130. The display module 125 causes a liquid crystal or organic EL display to display the progress of the printing process (information transmitted from the display control module 110 of the process management apparatus 100).

The web browser 130 communicates with the display control module 110 of the process management apparatus 100 via the communication network 190 and causes the display to display the progress of the printing process.

The printer 150 is connected to the controller control module 105 of the process management apparatus 100. The printer 150 performs printing on a recording medium (such as paper) under control of the controller control module 105. For example, the printer 150 performs processing of "(3) printing (press)" in the workflow.

The bookbinder 160 is connected to the controller control module 105 of the process management apparatus 100. The bookbinder 160 binds recording media printed by the printer 150. For example, the bookbinder 160 performs processing of "(4) post-processing (postpress)" in the printing workflow.

The order information management module 115 performs processing of "(1) manuscript reception" in the printing workflow. The controller control module 105 performs processing of "(2) pre-processing (prepress)" in the workflow. For example, processing statuses of "(5) inspection" and "(6) delivery" in the workflow may be acquired through communication with an inspection management system and a transport management system (specifically, a package inquiry system). Thus, the controller control module 105 (display control module 110) may acquire, for example, the processing statuses of "(1) manuscript reception", "(2) pre-processing (prepress)", "(3) printing (press)", "(4) post-processing (postpress)", "(5) inspection", and "(6) delivery" in the workflow.

Figure 2:
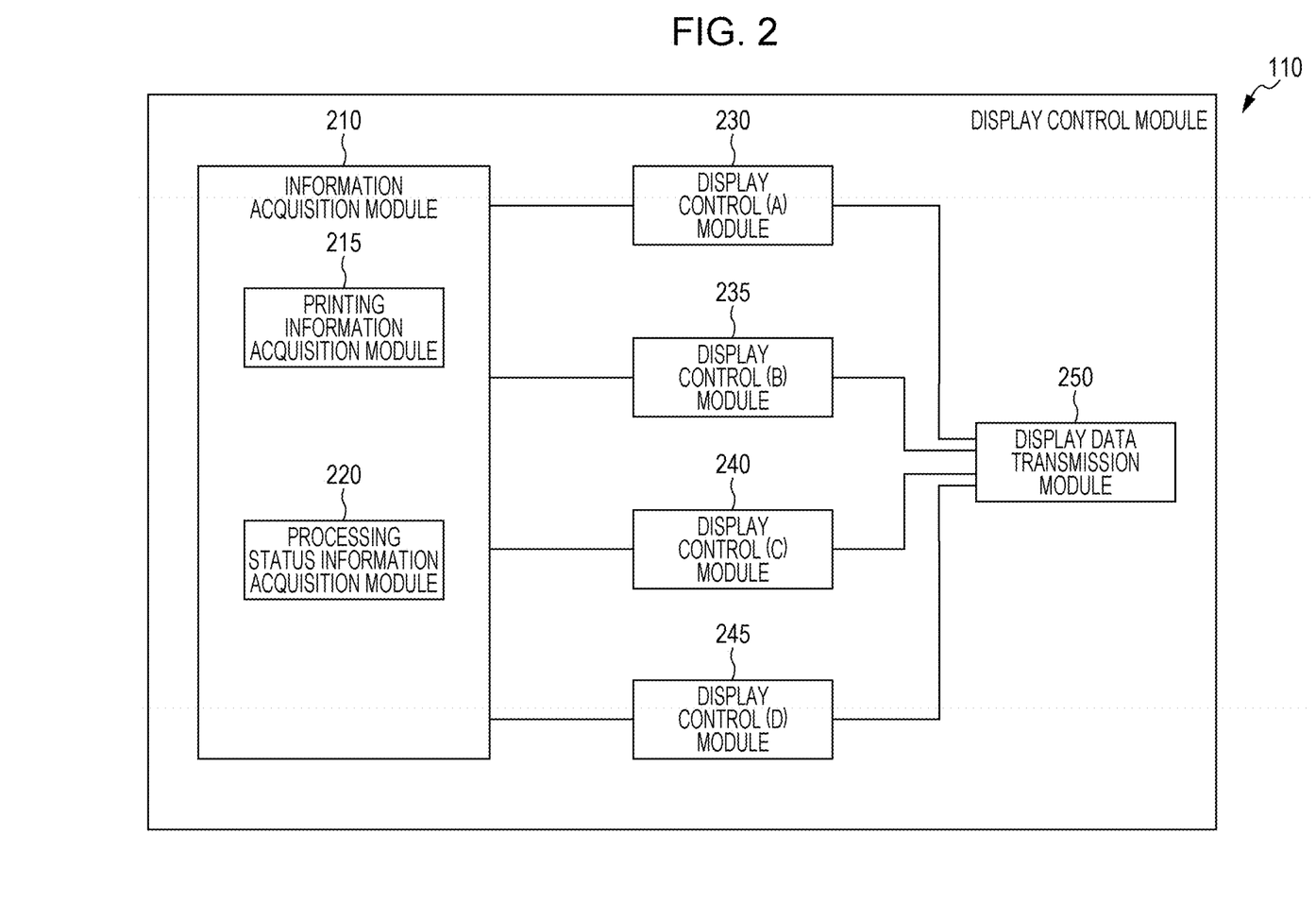
FIG. 2 schematically illustrates the configuration of modules as an example of the internal configuration of a display control module.

FIG. 2 schematically illustrates the configuration of modules as an example of the internal configuration of the display control module 110.

The display control module 110 includes an information acquisition module 210, a display control (A) module 230, a display control (B) module 235, a display control (C) module 240, a display control (D) module 245, and a display data transmission module 250.

The information acquisition module 210 includes a printing information acquisition module 215 and a processing status information acquisition module 220 and is connected to the display control (A) module 230, the display control (B) module 235, the display control (C) module 240, and the display control (D) module 245. The information acquisition module 210 acquires printing information and information related to processing statuses of printing steps in accordance with a printing workflow.

The printing information acquisition module 215 acquires target printing information in the printing workflow from the order information management module 115. The printing information is also referred to as a print job and includes print data and its attributes (such as information indicating color or monochrome printing, the size of a recording medium, and the type of the recording medium).

The processing status information acquisition module 220 acquires processing statuses from processing apparatuses corresponding to the respective processing steps. As described above, the processing status information acquisition module 220 acquires, for example, the processing statuses of "(1) manuscript reception", "(2) pre-processing (prepress)", "(3) printing (press)", "(4) post-processing (postpress)", "(5) inspection", and "(6) delivery" in the workflow from the controller control module 105, the order information management module 115, the printer 150, the bookbinder 160, and the like.

The display control (A) module 230 is connected to the information acquisition module 210 and the display data transmission module 250. The display control (A) module 230 generates data for causing the client apparatus 120 (display module 125) to display, in association with printing information, a first graphical object in which a plurality of step-representing graphical objects (hereinafter referred to also as phase icons) corresponding to a plurality of processing steps for the printing information are arrayed in a sequence identical to that of the processing steps. Examples of the "plurality of processing steps" include "(1) manuscript reception", "(2) pre-processing (prepress)", "(3) printing (press)", "(4) post-processing (postpress)", "(5) inspection", and "(6) delivery". Specific examples of the "step-representing graphical object" are described later in an example of FIG. 5. The "first graphical object" includes a group of step-representing graphical objects and corresponds to, for example, a phase icon display area 1012 described later in an example of FIG. 10.

The display control (A) module 230 may control the client apparatus 120 (display module 125) to display the first graphical object on a display screen in which a plurality of pieces of printing information are displayed while being categorized by orders. Examples of this display format include an order list-associated status table 1110 described later in an example of FIG. 11. One or more pieces of printing information are associated with one piece of order information.

The display control (A) module 230 may control the client apparatus 120 (display module 125) to display the first graphical object on a display screen in which a plurality of pieces of printing information categorized as one processing step are displayed. For example, a processing step may be selected and processing statuses of a plurality of pieces of printing information in this processing step alone may be displayed.

The display control (B) module 235 is connected to the information acquisition module 210 and the display data transmission module 250. The display control (B) module 235 acquires status information indicating a processing status of printing information in each processing step and generates data for causing the client apparatus 120 (display module 125) to display a first step-representing graphical object corresponding to a first processing step whose status information indicates that processing is in progress while changing the format of the first step-representing graphical object to a format different from those of other step-representing graphical objects. The "status information" corresponds to the status of each printing step, such as "pending", "in progress", "error", "pause", or "completed". The processing status information acquisition module 220 acquires the status from the processing apparatus of each step. The "other step-representing graphical objects" refer to step-representing graphical objects corresponding to processing steps in which processing is not in progress (specifically, a processing step in which processing has been completed or a processing step in which processing is pending). Examples of the "different format" include a format in which the "first step-representing graphical object corresponding to the first processing step" is displayed in a color different from the colors of the "other step-representing graphical objects".

The display control (B) module 235 may control the client apparatus 120 (display module 125) to display a second step-representing graphical object corresponding to a second processing step whose status information indicates that processing has been completed and a third step-representing graphical object corresponding to a third processing step whose status information indicates that processing is pending while distinguishing the color of the second step-representing graphical object from the color of the third step-representing graphical object. Description is given later in the example of FIG. 10.

The display control (B) module 235 may also control the client apparatus 120 (display module 125) to display the first step-representing graphical object while changing the color of the first step-representing graphical object as well as the color of the second step-representing graphical object and the color of the third step-representing graphical object.

The display control (C) module 240 is connected to the information acquisition module 210 and the display data transmission module 250. The display control (C) module 240 generates data for causing the client apparatus 120 (display module 125) to display information indicating details of the processing performed in the first processing step while juxtaposing the information with the first graphical object. As the "juxtaposing of the information with the first graphical object", it is appropriate that the information indicating details of the processing be displayed near (above, below, or side by side with) the first graphical object. Examples of this display format include a status message display area 1014 described later in the example of FIG. 10. The display format of the information indicating details of the processing may be character information (text) or a graphical object.

The display control (C) module 240 may control the display format to be changed when the information indicating details of the processing is related to an error. Examples of the "changing of the display format" may include changing of a color and addition of an icon (such as a mark or a graphical object) indicating an error.

The display control (C) module 240 may control the display format to be changed when the information indicating details of the processing is related to an alert. Examples of the "changing of the display format" may include changing of a color and addition of an icon (such as a mark) indicating an alert.

The display control (C) module 240 may control the client apparatus 120 (display module 125) to further display information related to the printing information associated with the first graphical object.

The display control (D) module 245 is connected to the information acquisition module 210 and the display data transmission module 250. The display control (D) module 245 generates data for causing the client apparatus 120 (display module 125) to display a second graphical object having different formats depending on the status information of the first processing step while superposing the second graphical object on the first step-representing graphical object. Description is given later in an example of FIGS. 12A to 12D.

The "second graphical object" may be a graphical object having different formats at least corresponding to processing statuses indicating that the processing is normally in progress, an error has occurred, and an alert has been issued.

The display data transmission module 250 is connected to the display control (A) module 230, the display control (B) module 235, the display control (C) module 240, and the display control (D) module 245. The display data transmission module 250 controls the client apparatus 120 (display module 125) to perform displaying. For example, the display data transmission module 250 transmits HyperText Markup Language (HTML) contents that have been created by the display control (A) module 230, the display control (B) module 235, the display control (C) module 240, and the display control (D) module 245 and may be displayed by the web browser 130 to the client apparatus 120 by HyperText Transfer Protocol (HTTP).

Figure 3:
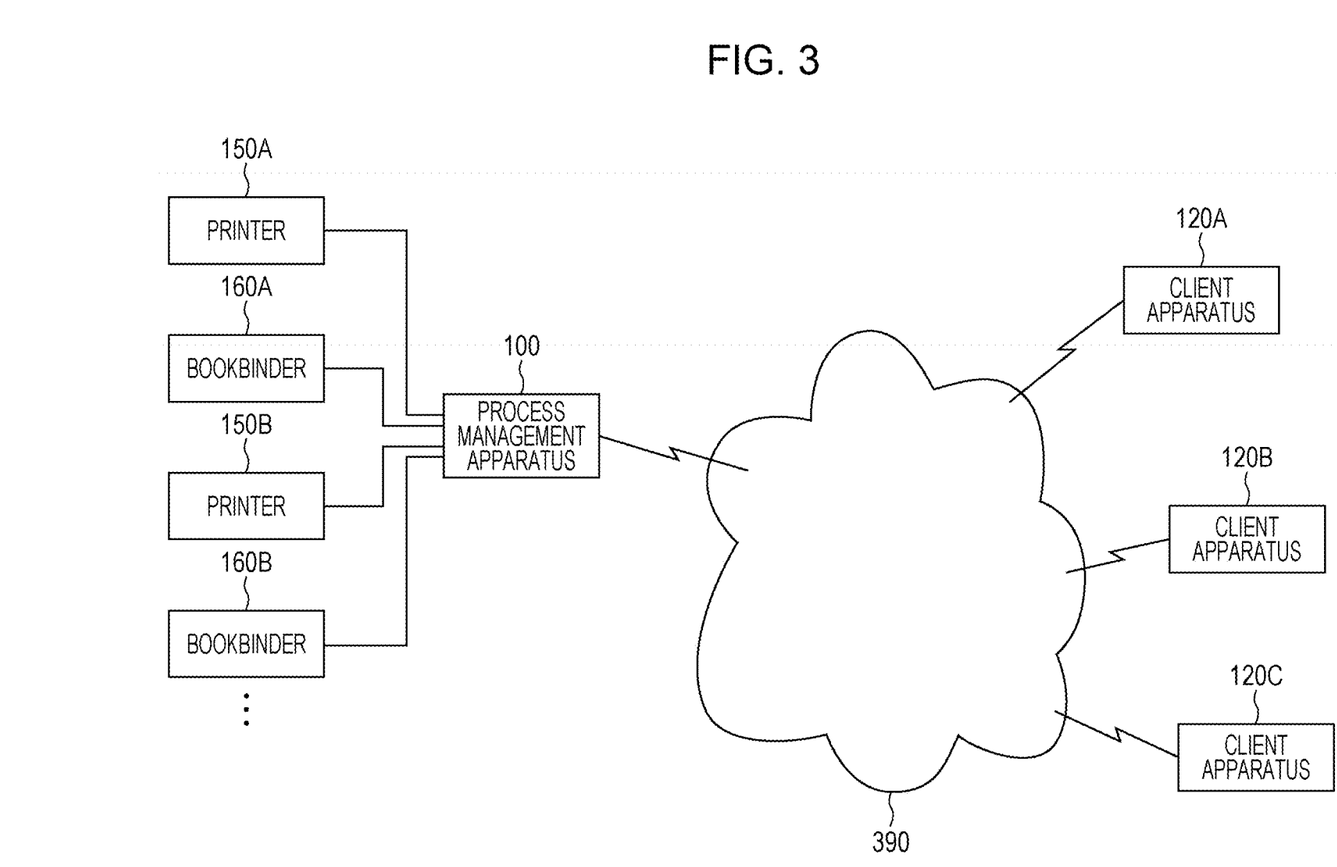
FIG. 3 illustrates an example of the system configuration that utilizes this exemplary embodiment.

FIG. 3 illustrates an example of the system configuration that utilizes this exemplary embodiment. The process management apparatus 100 may report processing statuses in a printing workflow to a plurality of client apparatuses 120.

The process management apparatus 100, a client apparatus 120A, a client apparatus 120B, a client apparatus 120C, and the like are connected to each other via a communication network 390. The communication network 390 may be a wired network, a wireless network, or a combination thereof. Examples of the communication network 390 may include the Internet and an intranet as communication infrastructure. The functions of the process management apparatus 100 may be implemented as cloud services.

The process management apparatus 100 is connected to a printer 150A, a bookbinder 160A, a printer 150B, a bookbinder 160B, and the like. The process management apparatus 100 may execute the printing workflow by using the plurality of printers 150 and the plurality of bookbinders 160.

Figure 4:
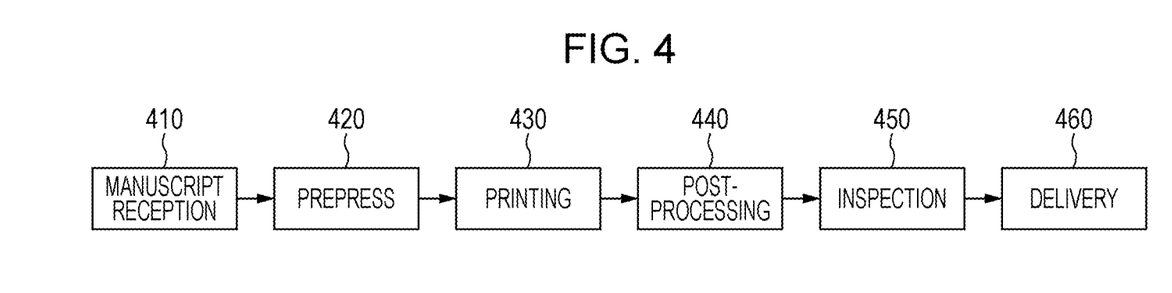
FIG. 4 illustrates an example of a printing workflow.

FIG. 4 illustrates an example of the printing workflow.

FIG. 4 illustrates an example in which manuscript reception 410, prepress 420, printing 430, post-processing 440, inspection 450, and delivery 460 are provided as processing steps. The processing operations are performed in this sequence. Other processing steps may be added to the printing workflow or any one of the processing steps (for example, the inspection 450) may be skipped (omitted).

Figure 5:
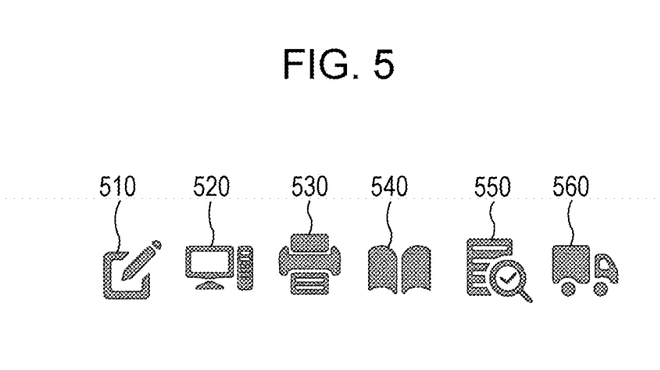
FIG. 5 illustrates an example of phase icons indicating processing steps in the printing workflow.

FIG. 5 illustrates an example of the phase icons indicating the processing steps in the printing workflow (example of the step-representing graphical objects).

A phase icon (manuscript reception) 510 corresponds to the manuscript reception 410. A phase icon (prepress) 520 corresponds to the prepress 420. A phase icon (printing) 530 corresponds to the printing 430. A phase icon (post-processing) 540 corresponds to the post-processing 440. A phase icon (inspection) 550 corresponds to the inspection 450. A phase icon (delivery) 560 corresponds to the delivery 460.

For example, a phase icon having three colors may be prepared as each phase icon. Examples of the colors include blue (color indicating that processing is in progress), light gray (color indicating that processing has been completed), and dark gray (color indicating that processing is pending).

Figure 6:
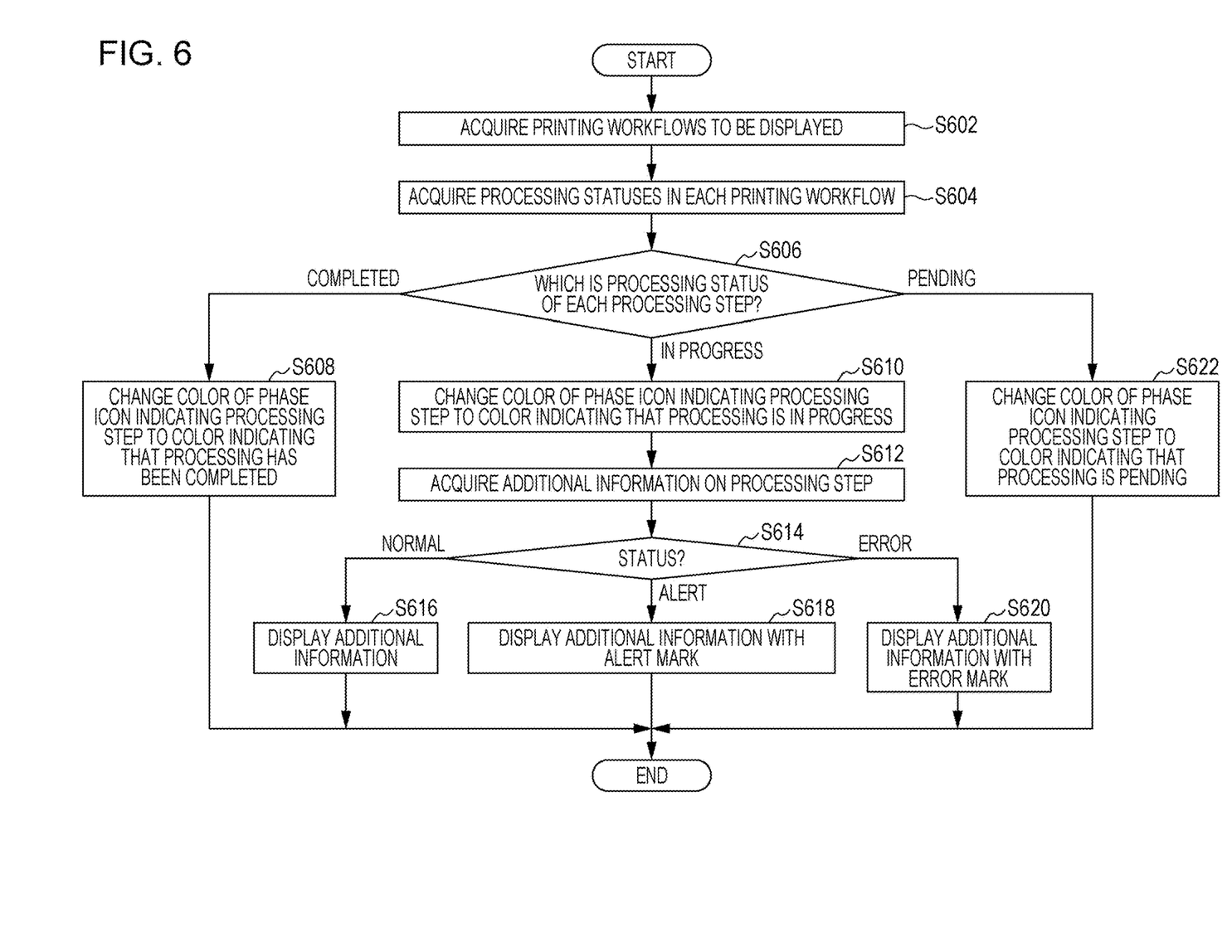
FIG. 6 is a flowchart illustrating an example of processing according to this exemplary embodiment.

FIG. 6 is a flowchart illustrating an example of processing according to this exemplary embodiment.

Figure 7:
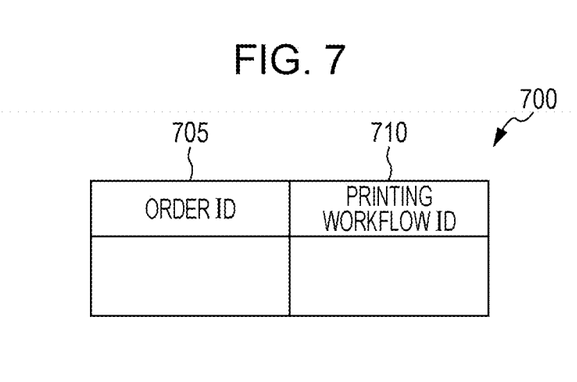
FIG. 7 illustrates an example of the data structure of an order/printing workflow correspondence table.

In Step S602, a plurality of printing workflows to be displayed are acquired. For example, ordered printing workflows are acquired by using an order/printing workflow correspondence table 700.

Figure 8:
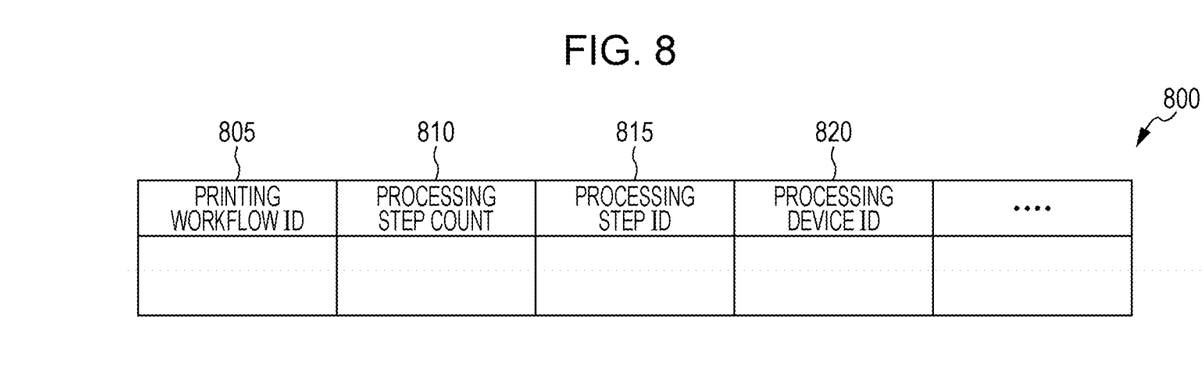
FIG. 8 illustrates an example of the data structure of a processing step/processing device correspondence table.
Figure 9:
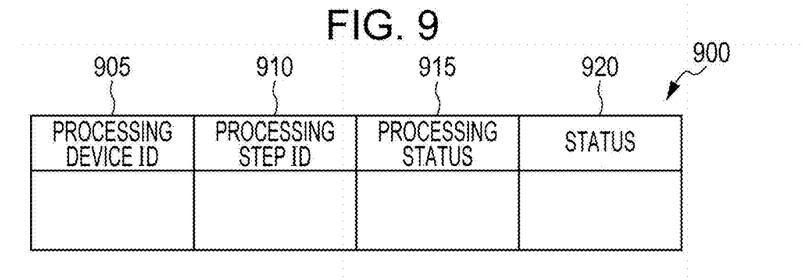
FIG. 9 illustrates an example of the data structure of a processing status table.

In Step S604, processing statuses in each printing workflow are acquired. For example, processing step IDs in each printing workflow and processing device IDs of processing devices that perform processing operations in the processing steps are acquired by using a processing step/processing device correspondence table 800 and processing statuses and statuses of the processing steps are acquired by using a processing status table 900.

In Step S606, determination is made on the processing status of each processing step. When the processing status is "completed", the processing proceeds to Step S608. When the processing status is "in progress", the processing proceeds to Step S610. When the processing status is "pending", the processing proceeds to Step S622.

In Step S608, the color of the phase icon indicating the processing step is changed to a color indicating that processing has been completed (for example, light gray).

In Step S610, the color of the phase icon indicating the processing step is changed to a color indicating that processing is in progress (for example, blue).

In Step S612, additional information on the processing step is acquired.

In Step S614, determination is made on the status. When the status is "normal", the processing proceeds to Step S616. When the status is "alert", the processing proceeds to Step S618. When the status is "error", the processing proceeds to Step S620.

In Step S616, the additional information is displayed.

In Step S618, the additional information is displayed with an alert mark. Examples of the alert mark include an alert mark shown in a status message display area 1034 illustrated in FIG. 10.

In Step S620, the additional information is displayed with an error mark. Examples of the error mark include an error mark shown in a status message display area 1024 illustrated in FIG. 10.

In Step S622, the color of the phase icon indicating the processing step is changed to a color indicating that processing is pending (for example, dark gray).

FIG. 7 illustrates an example of the data structure of the order/printing workflow correspondence table 700.

The order/printing workflow correspondence table 700 has an order ID field 705 and a printing workflow ID field 710. In this exemplary embodiment, the order ID field 705 stores information for uniquely identifying an order (order IDentification (ID)). In this exemplary embodiment, the printing workflow ID field 710 stores information for uniquely identifying a printing workflow (printing workflow ID). With the order/printing workflow correspondence table 700, correspondence between the order ID and the printing workflow is managed.

FIG. 8 illustrates an example of the data structure of the processing step/processing device correspondence table 800.

The processing step/processing device correspondence table 800 has a printing workflow ID field 805, a processing step count field 810, a processing step ID field 815, and a processing device ID field 820. The printing workflow ID field 805 stores a printing workflow ID. The processing step count field 810 stores a processing step count. In this exemplary embodiment, the processing step ID field 815 stores information for uniquely identifying a processing step (processing step ID). In this exemplary embodiment, the processing device ID field 820 stores information for uniquely identifying a processing device (processing device ID). Subsequently to the processing device ID field 820, sets of the processing step ID field 815 and the processing device ID field 820 are provided as many as the count shown in the processing step count field 810. With the processing step/processing device correspondence table 800, correspondence between the processing step in the printing workflow and the processing device that performs a processing operation in the processing step is managed.

FIG. 9 illustrates an example of the data structure of the processing status table 900.

The processing status table 900 has a processing device ID field 905, a processing step ID field 910, a processing status field 915, and a status field 920. The processing device ID field 905 stores a processing device ID. The processing step ID field 910 stores a processing step ID. The processing status field 915 stores a processing status of the processing step. The status field 920 stores a status of the processing step. With the processing status table 900, the processing status and the status of the processing step in the printing workflow are managed.

Figure 10:
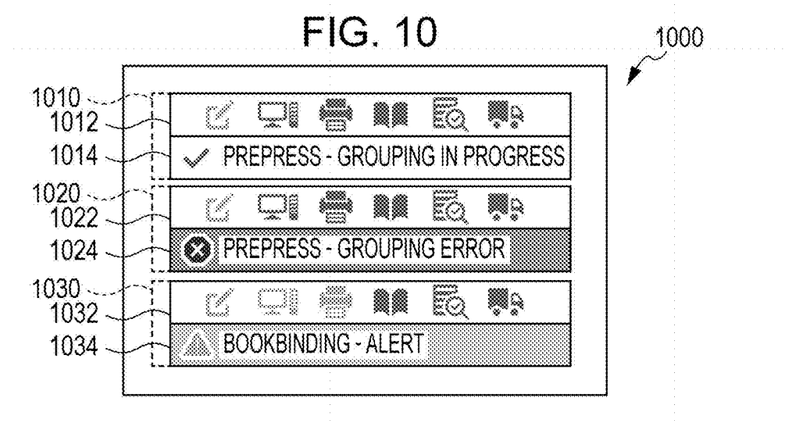
FIG. 10 illustrates a display example of a processing status and a status of each processing step in the printing workflow.

FIG. 10 illustrates a display example of the processing status and the status of each processing step in the printing workflow.

FIG. 10 illustrates an example in which statuses are displayed in an order list. That is, an array of phase icons is displayed in an upper part and a status message is displayed in a lower part. The phase icon in the upper part represents the progress of a phase and the status message in the lower part provides additional information for the phase icon in the upper part. As necessary, an error or alert message is displayed.

A status display area 1010, a status display area 1020, and a status display area 1030 are displayed on a screen 1000.

The phase icon display area 1012 and the status message display area 1014 are displayed in the status display area 1010. A phase icon display area 1022 and the status message display area 1024 are displayed in the status display area 1020. A phase icon display area 1032 and the status message display area 1034 are displayed in the status display area 1030. The phase icon (manuscript reception) 510, the phase icon (prepress) 520, the phase icon (printing) 530, the phase icon (post-processing) 540, the phase icon (inspection) 550, and the phase icon (delivery) 560 are displayed in each of the phase icon display area 1012, the phase icon display area 1022, and the phase icon display area 1032. For example, in each of the phase icon display area 1012 and the phase icon display area 1022, the phase icon (manuscript reception) 510 is displayed in light gray (indicating that processing has been completed), the phase icon (prepress) 520 is displayed in blue (indicating that processing is in progress), and the phase icon (printing) 530, the phase icon (post-processing) 540, the phase icon (inspection) 550, and the phase icon (delivery) 560 are displayed in dark gray (indicating that processing is pending). For example, in the phase icon display area 1032, the phase icon (manuscript reception) 510, the phase icon (prepress) 520, and the phase icon (printing) 530 are displayed in light gray (indicating that processing has been completed), the phase icon (post-processing) 540 is displayed in blue (indicating that processing is in progress), and the phase icon (inspection) 550 and the phase icon (delivery) 560 are displayed in dark gray (indicating that processing is pending). For example, in the status message display area 1014, a message "prepress—grouping in progress" is displayed for the processing of the phase icon (prepress) 520. For example, in the status message display area 1024, a message "prepress—grouping error" is displayed for the phase icon (prepress) 520. For example, in the status message display area 1034, a message "bookbinding—alert" is displayed for the phase icon (post-processing) 540.

When a skipped phase (for example, the inspection phase) is present, the phase icon may be hidden or a mark "=" (mark indicating a skip) may be displayed while being superposed on the phase icon. That is, when a skipped phase is present, the following control is performed.

(1) The number of phase icons in the status display area 1010 is varied depending on the number of processing steps in the printing workflow.

(2) Six phase icons are displayed in the status display area 1010 irrespective of the number of processing steps in the printing workflow and the mark "=" is displayed while being superposed on the phase icon of the skipped phase.

Figure 11:
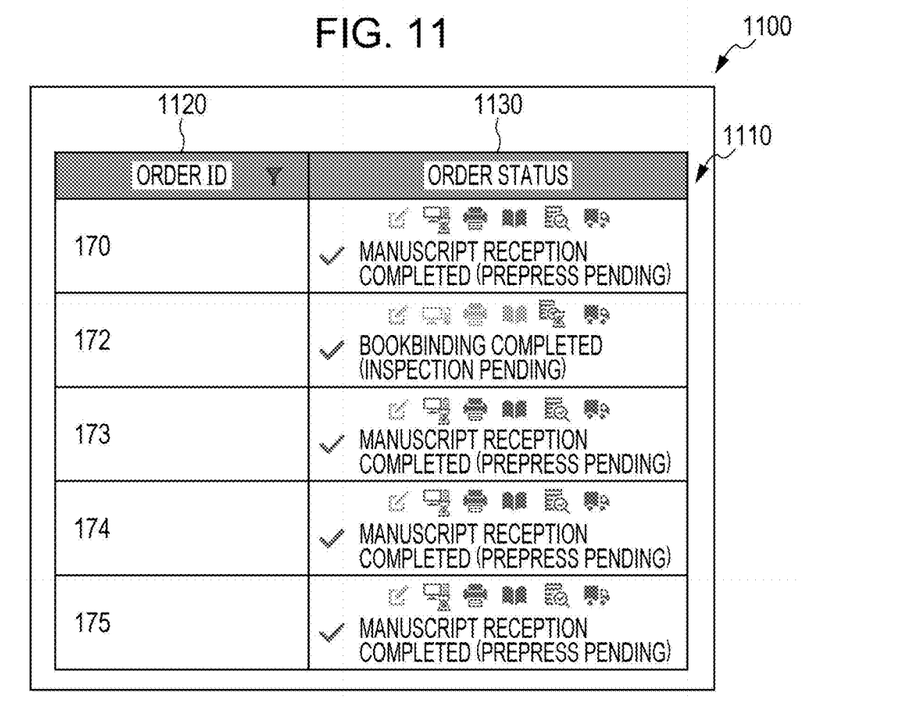
FIG. 11 illustrates a display example of the processing status and the status of each processing step for each order ID.

FIG. 11 illustrates a display example of the processing status and the status of each processing step for each order ID. In this display example, the phase icon display area 1012 and the like are displayed on a display screen while being categorized by order IDs.

The order list-associated status table 1110 is displayed on a screen 1100.

The order list-associated status table 1110 has an order ID field 1120 and an order status field 1130. Order IDs are displayed in the order ID field 1120. Order statuses are displayed in the order status field 1130. Items equivalent to those of the status display area 1010 illustrated in the example of FIG. 10 are displayed in each row of the order status field 1130.

FIGS. 12A to 12D illustrate display examples of superposition of a sub-icon on a phase icon. That is, FIGS. 12A to 12D illustrate examples in which progress and a status are displayed with the sub-icon.

Figure 12A:
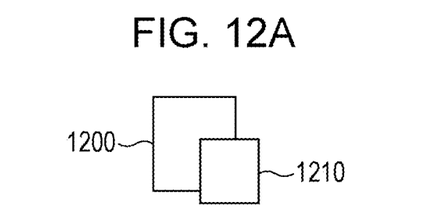
FIGS. 12A to 12D illustrate display examples of superposition of a sub-icon on the phase icon.

FIG. 12A illustrates an example in which a sub-icon 1210 (example of the second graphical object) is displayed while being superposed on a phase icon 1200 (example of the step-representing graphical object). The sub-icon 1210 indicates a status of a phase corresponding to the phase icon 1200.

Figure 12B:
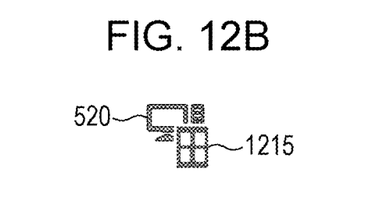

FIG. 12B illustrates that the prepress (imposition) is normally in progress by displaying a sub-icon (prepress: normal) 1215 while superposing the sub-icon (prepress: normal) 1215 on the phase icon (prepress) 520.

Figure 12C:
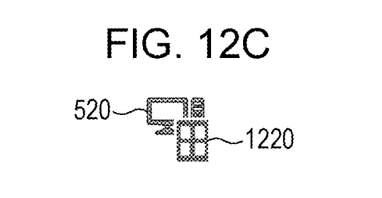

FIG. 12C illustrates that an error has occurred in the prepress (imposition) by displaying a sub-icon (prepress: error) 1220 while superposing the sub-icon (prepress: error) 1220 on the phase icon (prepress) 520.

Figure 12D:
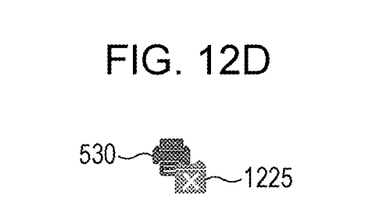

In FIG. 12D, an alert is issued to indicate that a print job has not been scheduled in a printer by displaying a sub-icon (unscheduled) 1225 while superposing the sub-icon (unscheduled) 1225 on the phase icon (printing) 530.

The sub-icon represents the progress of each phase in a particular form (for example, a shape). The sub-icon may also represent a status by changing the color of the sub-icon to indicate "normal" (green), "error" (red), or "alert" (yellow). The error and the alert are defined in advance depending on statuses. For example, the error requires that measures be taken promptly and the alert indicates that measures may be taken later on. There is a difference therebetween in terms of urgency.

The sub-icon is displayed while being superposed on a phase icon indicating that processing is in progress. The sub-icon is displayed while being superposed on the phase icon in order to prevent the display areas of the two icons (phase icon and sub-icon) from becoming wider. If the display areas do not become wider, the superposition is not necessary but the sub-icon may be placed near the phase icon. For example, the sub-icon may be inserted into a blank space in the phase icon.

Figure 13A:
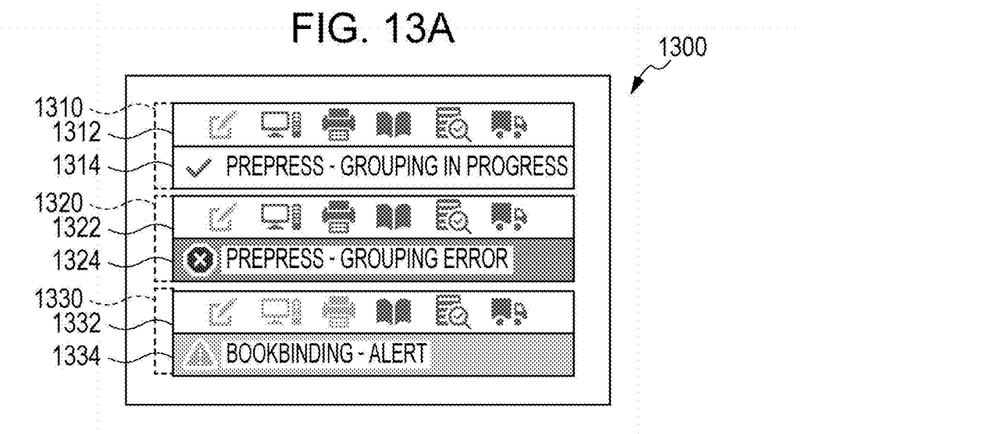
FIGS. 13A and 13B illustrate display examples of the processing status and the status of each processing step in the printing workflow.
Figure 13B:
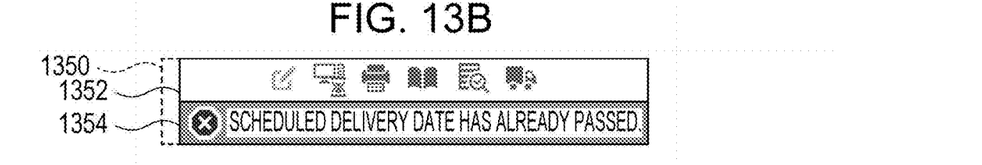

FIGS. 13A and 13B illustrate display examples of the processing status and the status of each processing step in the printing workflow. That is, a status message provides additional information for a phase indicated by a phase icon in an upper part. As necessary, an error or alert message is displayed.

A status display area 1310, a status display area 1320, and a status display area 1330 are displayed on a screen 1300 illustrated in the example of FIG. 13A. A phase icon display area 1312 and a status message display area 1314 are displayed in the status display area 1310. A phase icon display area 1322 and a status message display area 1324 are displayed in the status display area 1320. A phase icon display area 1332 and a status message display area 1334 are displayed in the status display area 1330.

For example, in the status message display area 1314, a message "prepress—grouping in progress" is displayed for the processing of the phase icon (prepress) 520. For example, in the status message display area 1324, a message "prepress—grouping error" is displayed for the processing of the phase icon (prepress) 520. For example, in the status message display area 1334, a message "bookbinding—alert" is displayed for the processing of the phase icon (post-processing) 540.

In the case of an error or an alert, a background color is provided (for example, red in the case of an error and yellow in the case of an alert) to increase the user's visibility.

A phase icon display area 1352 and a status message display area 1354 are displayed in a status display area 1350 illustrated in the example of FIG. 13B. FIG. 13B illustrates an example in which, when there is a need to display information with priority, the information is displayed as a message. That is, a message that is not related to a phase in which processing is in progress may be displayed.

For example, a message "Scheduled delivery date has already passed." is displayed in the status message display area 1354. That is, this message indicates that the scheduled delivery date has passed and measures need to be taken promptly. The message related to the printing workflow is displayed so that the user becomes aware of the message when viewing the status message display area 1354.

Figure 14:
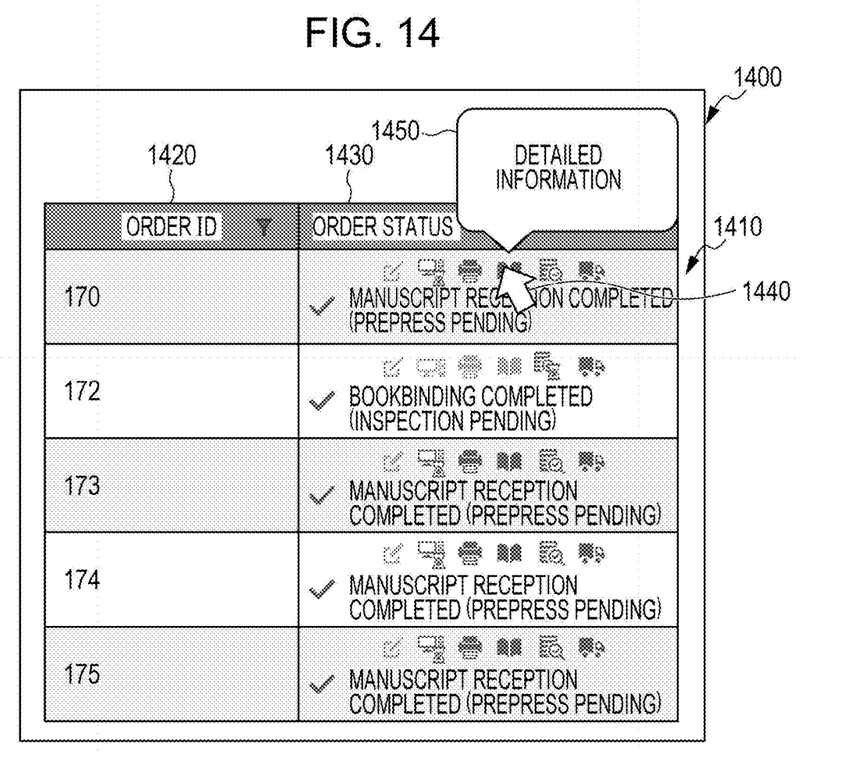
FIG. 14 illustrates a display example of a message.

FIG. 14 illustrates a display example of the message. That is, FIG. 14 illustrates an example of tooltip display.

An order list-associated status table 1410 is displayed on a screen 1400. The order list-associated status table 1410 has an order ID field 1420 and an order status field 1430. The order ID field 1420 stores order IDs. The order status field 1430 stores order statuses. A tooltip 1450 is displayed when a cursor 1440 is placed on a phase icon in the printing workflow. The cursor 1440 is placed on the phase icon (post-processing) 540 and therefore detailed information related to the phase icon (post-processing) 540 is displayed in the tooltip 1450. For example, detailed information that is not fitted in the status message display area is displayed in the tooltip 1450.

Figure 15:
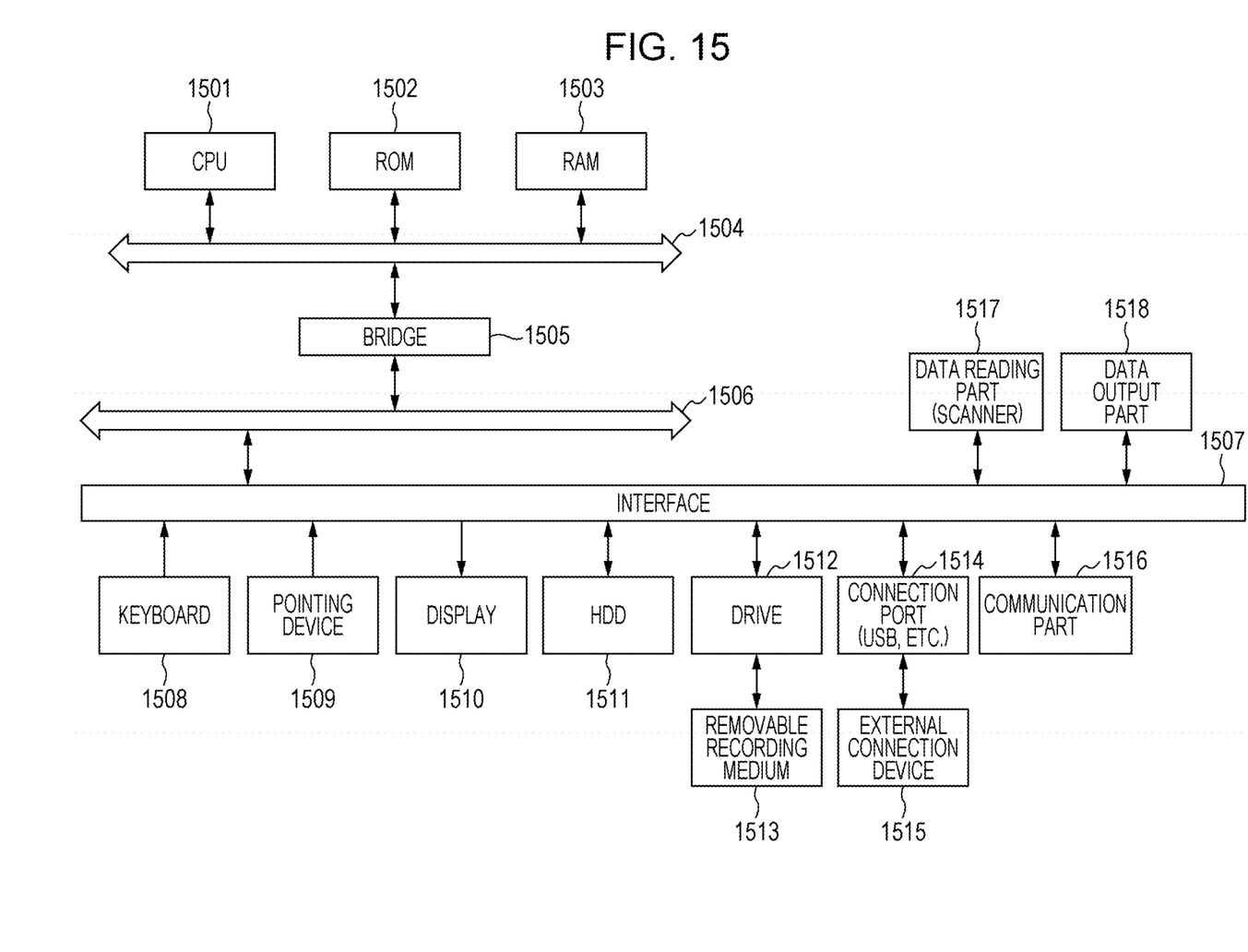
FIG. 15 is a block diagram illustrating an example of the hardware configuration of a computer that implements this exemplary embodiment.

An example of the hardware configuration of the process management apparatus 100 of this exemplary embodiment is described with reference to FIG. 15. For example, the configuration illustrated in FIG. 15 is implemented by a personal computer (PC). FIG. 15 illustrates an example of the hardware configuration including a data reading part 1517 such as a scanner and a data output part 1518 such as a printer.

A central processing unit (CPU) 1501 is a controller that executes processing in accordance with computer programs describing execution sequences of various modules described above in the exemplary embodiment, that is, the controller control module 105, the display control module 110, the order information management module 115, the information acquisition module 210, the printing information acquisition module 215, the processing status information acquisition module 220, the display control (A) module 230, the display control (B) module 235, the display control (C) module 240, the display control (D) module 245, and the display data transmission module 250.

A read only memory (ROM) 1502 stores the programs and operational parameters to be used by the CPU 1501. A random access memory (RAM) 1503 stores programs to be used for execution of the CPU 1501 and parameters that change as appropriate in the execution. Those components are connected to each other by a host bus 1504 that is a CPU bus or the like.

The host bus 1504 is connected to an external bus 1506 such as a peripheral component interconnect/interface (PCI) bus via a bridge 1505.

A keyboard 1508 and a pointing device 1509 such as a mouse are devices to be operated by an operator. A display 1510 is typified by a liquid crystal display apparatus and a cathode ray tube (CRT) and displays various types of information as text or image information. There may be employed a touchscreen or the like that has functions of both the pointing device 1509 and the display 1510. In this case, the function of the keyboard may be implemented by rendering a keyboard on a screen (touchscreen) by software (referred to also as a software keyboard or a screen keyboard) without physical connection as in the case of the keyboard 1508.

A hard disk drive (HDD) 1511 includes hard disks (may be a flash memory or the like) and drives the hard disks to record or reproduce information or programs to be executed by the CPU 1501. The hard disks store the printing information, the order/printing workflow correspondence table 700, the processing step/processing device correspondence table 800, and the processing status table 900. The hard disks also store various other types of data and computer programs.

A drive 1512 reads data or programs recorded in a removable recording medium 1513 inserted thereto, such as a magnetic disk, an optical disc, a magneto-optical disk, or a semiconductor memory, and supplies the data or programs to the RAM 1503 connected via an interface 1507, the external bus 1506, the bridge 1505, and the host bus 1504. The removable recording medium 1513 may also be used as a data recording area.

A connection port 1514 is a port that connects an external connection device 1515 and has connectors for USB, IEEE 1394, and the like. The connection port 1514 is connected to the CPU 1501 and the like via the interface 1507, the external bus 1506, the bridge 1505, the host bus 1504, and the like. A communication part 1516 is connected to a communication network and executes external data communication processing. For example, the data reading part 1517 is a scanner and executes document reading processing. For example, the data output part 1518 is a printer and executes document data output processing.

The hardware configuration of the process management apparatus 100 illustrated in FIG. 15 is one configuration example and this exemplary embodiment is not limited to the configuration illustrated in FIG. 15 as long as the modules described in this exemplary embodiment may be executed. For example, a subset of the modules may be implemented by dedicated hardware (such as an application specific integrated circuit (ASIC)). A subset of the modules may be located in an external system and connected via a communication network. A plurality of systems illustrated in FIG. 15 may be connected to each other via a communication network and operate in cooperation. In particular, the system may be embedded not only in a personal computer but also in a portable information communication apparatus (including a mobile phone, a smartphone, a mobile apparatus, and a wearable computer), a home information appliance, a robot, a copying machine, a facsimile machine, a scanner, a printer, and a multifunction peripheral (image processing apparatus having two or more functions of those of a scanner, a printer, a copying machine, and a facsimile machine).

The program described above may be provided while being stored in a recording medium or may be provided by a communication medium. In this case, for example, the program described above may be understood as a "non-transitory computer readable medium storing a program".

The "non-transitory computer readable medium storing a program" refers to a non-transitory computer readable medium that stores a program and is used for installing, executing, or distributing the program.

Examples of the recording medium include digital versatile discs (DVDs) such as "DVD-R", "DVD-RW", and "DVD-RAM" that are standards developed by the DVD Forum and "DVD+R" and "DVD+RW" that are standards developed by the DVD+RW Alliance, compact discs (CDs) such as CD-Read Only Memory (CD-ROM), CD-Recordable (CD-R), and CD-ReWritable (CD-RW), Blu-ray (registered trademark) discs, magneto-optical disks (MOs), flexible disks (FDs), magnetic tapes, hard disks, read only memories (ROMs), electrically erasable programmable read only memories (EEPROMs (registered trademark)), flash memories, random access memories (RAMs), and secure digital (SD) memory cards.

The whole or a part of the program described above may be stored or distributed while being recorded in the recording medium. The program may be transmitted by communications via transmission media such as a wired network, a wireless communication network, and a combination thereof, which are used in, for example, a local area network (LAN), a metropolitan area network (MAN), a wide area network (WAN), the Internet, an intranet, and an extranet. The program may be carried on a carrier wave.

The program described above may be a part or the whole of a different program or may be recorded in a recording medium together with a separate program. The program may be recorded separately in a plurality of recording media. The program may be recorded in any format such as a compressed or encrypted format as long as the program is reconstructible.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing process management apparatus, comprising:
   a processor, configured to:
      control a display to display, in association with printing information, a plurality of graphical objects, wherein each of the graphical objects comprises a plurality of step-representing graphical objects corresponding to a plurality of processing steps for the printing information arrayed in a sequence identical to a sequence of the processing steps;
      acquire status information indicating a processing status of the printing information in each of the processing steps and controls the display to display a first step-representing graphical object corresponding to a first processing step whose status information indicates that processing is in progress while changing a format of the first step-representing graphical object to a format different from formats of other step-representing graphical objects; and control the display to display information indicating details of the processing performed in the first processing step while juxtaposing the information with a first graphical object of the plurality of graphical objects.

2. The printing process management apparatus according to claim 1, wherein the processor controls the display to display the first graphical object on a display screen in which a plurality of pieces of printing information are displayed while being categorized by orders.

3. The printing process management apparatus according to claim 1, wherein the processor controls the display to display the first graphical object on a display screen in which a plurality of pieces of printing information categorized as one processing step are displayed.

4. The printing process management apparatus according to claim 1, wherein the processor controls the display to display a second step-representing graphical object corresponding to a second processing step whose status information indicates that processing has been completed and a third step-representing graphical object corresponding to a third processing step whose status information indicates that processing is pending while distinguishing a color of the second step-representing graphical object from a color of the third step-representing graphical object.

5. The printing process management apparatus according to claim 1, wherein the processor changes a display format when the information indicating details of the processing is related to an error.

6. The printing process management apparatus according to claim 1, wherein the processor changes a display format when the information indicating details of the processing is related to an alert.

7. The printing process management apparatus according to claim 1, wherein the processor controls the display to further display information related to the printing information associated with the first graphical object.

8. The printing process management apparatus according to claim 1, wherein the processor is further configured to:
control the display to display a second graphical object having different formats depending on the status information of the first processing step while superposing the second graphical object on the first step-representing graphical object.

9. The printing process management apparatus according to claim 8, wherein the second graphical object is a graphical object having different formats at least corresponding to processing statuses indicating that the processing is normally in progress, an error has occurred, and an alert has been issued.

10. The printing process management apparatus according to claim 1,
wherein each of the plurality of graphical objects corresponds to a workflow, and
wherein each of the plurality of workflows comprises the plurality of processing steps.

11. The printing process management apparatus according to claim 1,
wherein the processor controls the display to display a second step-representing graphical object corresponding to a second processing step whose status information indicates that processing has been completed and a third step-representing graphical object corresponding to a third processing step whose status information indicates that processing is pending.

12. The printing process management apparatus according to claim 1,
wherein the processor controls the display to display a second step-representing graphical object corresponding to a second processing step whose status information indicates that processing being different from that of the status information of the first processing step.

13. A non-transitory computer readable medium storing a printing process management program causing a computer to execute a process comprising:
controlling a display to display, in association with printing information, a plurality of graphical objects, wherein each of the graphical objects comprises a plurality of step-representing graphical objects corresponding to a plurality of processing steps for the printing information arrayed in a sequence identical to a sequence of the processing steps;
acquiring status information indicating a processing status of the printing information in each of the processing steps and controlling the display to display a first step-representing graphical object corresponding to a first processing step whose status information indicates that processing is in progress while changing a format of the first step-representing graphical object to a format different from formats of other step-representing graphical objects; and
controlling the display to display information indicating details of the processing performed in the first processing step while juxtaposing the information with a first graphical object of the plurality of graphical objects.

14. A printing process management apparatus, comprising:
first display control means for controlling display means to display, in association with printing information, a plurality of graphical objects, wherein each of the graphical objects comprises a plurality of step-representing graphical objects corresponding to a plurality of processing steps for the printing information arrayed in a sequence identical to a sequence of the processing steps;
second display control means for acquiring status information indicating a processing status of the printing information in each of the processing steps and controlling the display means to display a first step-representing graphical object corresponding to a first processing step whose status information indicates that processing is in progress while changing a format of the first step-representing graphical object to a format different from formats of other step-representing graphical objects; and
third display control means for controlling the display means to display information indicating details of the processing performed in the first processing step while juxtaposing the information with a first graphical object of the plurality of graphical objects.

* * * * *